Figure 1:
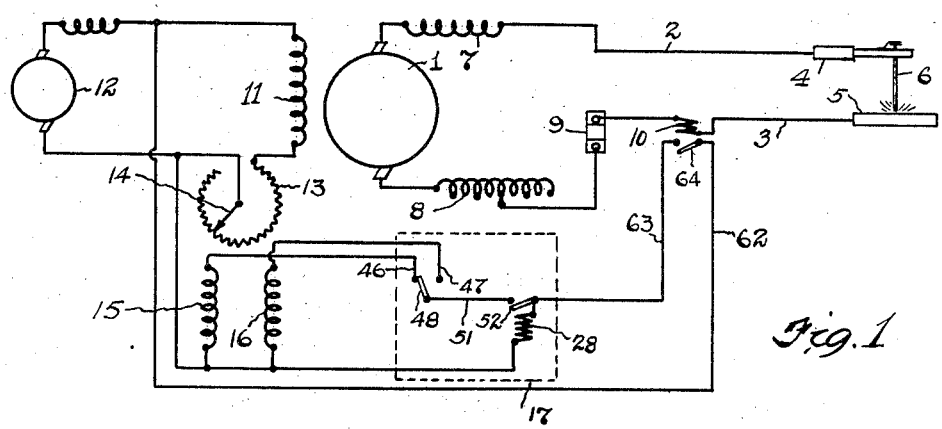

July 17, 1934.   G. G. LANDIS ET AL   1,967,158
DYNAMO ELECTRIC MACHINE CONTROL
Filed Dec. 4, 1933   3 Sheets-Sheet 1

INVENTORS
George G. Landis and
BY Norman J. Hoenie.
Fay, Oberlin & Fay
ATTORNEYS July 17, 1934.    G. G. LANDIS ET AL    1,967,158
DYNAMO ELECTRIC MACHINE CONTROL
Filed Dec. 4, 1933    3 Sheets-Sheet 2
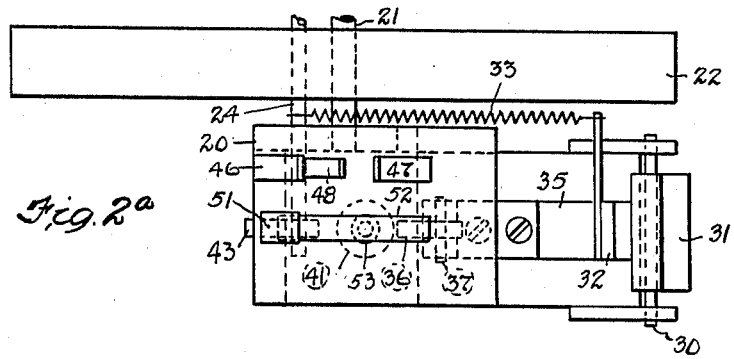
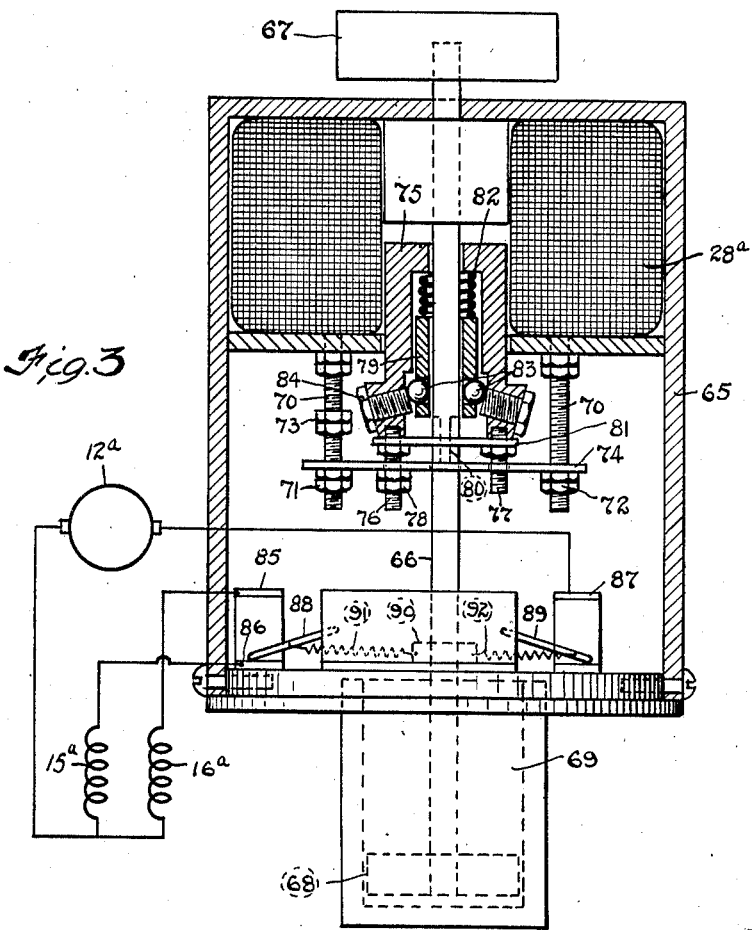
INVENTORS
George G. Landis and
BY Norman J. Hoenie
Fay, Oberlin & Fay
ATTORNEYS Patented July 17, 1934

UNITED STATES PATENT OFFICE 1,967,158

DYNAMO-ELECTRIC MACHINE CONTROL

George G. Landis and Norman J. Hoenie, Cleveland, Ohio, assignors to The Lincoln Electric Company, Cleveland, Ohio, a corporation of Ohio Application December 4, 1933, Serial No. 700,866

21 Claims. (Cl. 219—8)

This invention relates as indicated to control means for dynamo-electric machines whereby the operating characteristics of the machine may be varied or adjusted from a remote point and more particularly, by means responsive to controlled interruptions or the like in an external circuit.

More specifically, this invention relates to a form of apparatus for controlling the operating characteristics of an electric current generator, which apparatus is functionally responsive to a predetermined manipulation of the external circuit of the machine, particularly a repeated closing and opening of such circuit in a particular manner.

This invention is especially adapted to be used in conjunction with an electric arc welding current generator where it is desired to vary or control the operating characteristics of the machine from a remote point such as the welding station. It is to be understood, however, that while the present invention will be described as particularly applicable for use in conjunction with electric arc welding current generators, nevertheless, the principles of this invention may be employed for the control generally of dynamo electric machines regardless of the type and their particular use.

As is well known to those familiar with the art, it is frequently necessary, during the course of an arc welding operation, to change or control the operating characteristics of the welding current generator. This control may become necessary for a number of different reasons which need not be enumerated at this point.

With electric arc welding current generators as constructed at the present time, it is necessary for the operator to leave the welding station and return to the generator in order to effect any desired control, if only one operator is present, or to carry with him a rheostat or similar controlling device which, of course, must be connected by suitable leads to the generator.

It is the principal object of this invention to provide an apparatus for adjusting the control of operating characteristics of the welding current generator, which apparatus is functionally responsive to a repeated making and breaking of the arc in a predetermined fashion and for a predetermined number of times.

It is a further object of this invention to provide a means of the character described whereby the operator may, by merely striking the arc for a predetermined number of times, either increase or decrease the output of the welding current generator, which means, however, in no way interferes with the normal routine of the operator in making a weld.

Other objects of this invention will appear as the description proceeds.

To the accomplishment of the foregoing and related ends, said invention, then consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used:

In said annexed drawings:—

Figure 2:
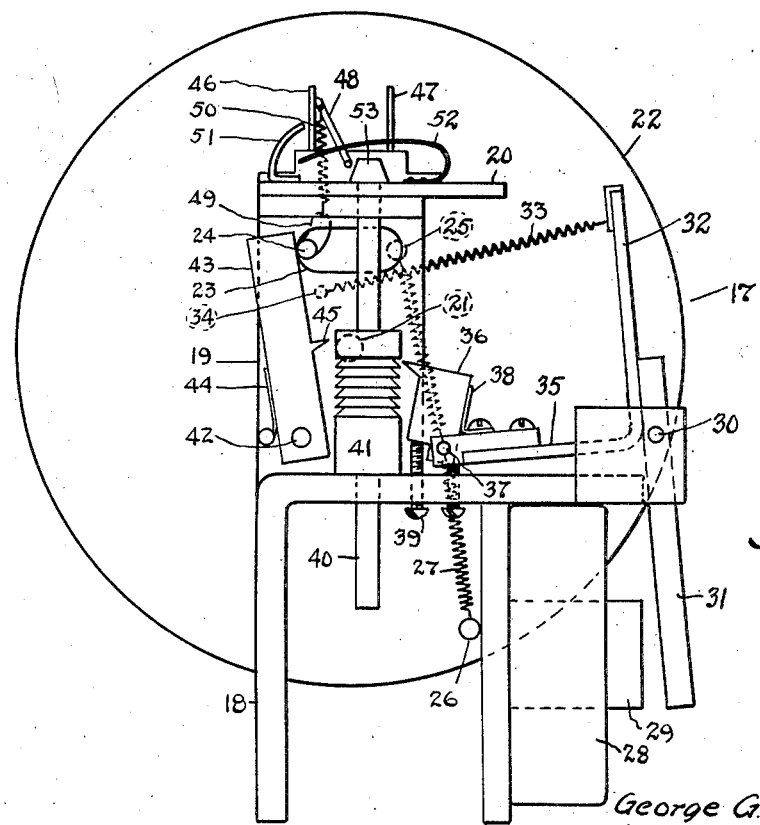
Figure 4:
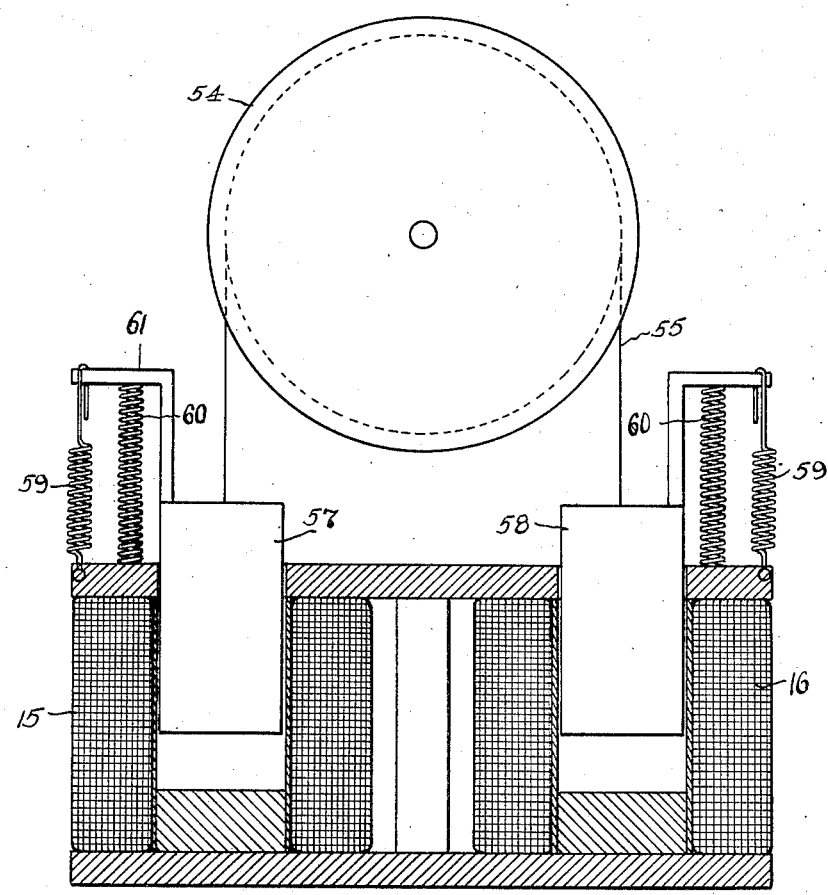
Figure 5:
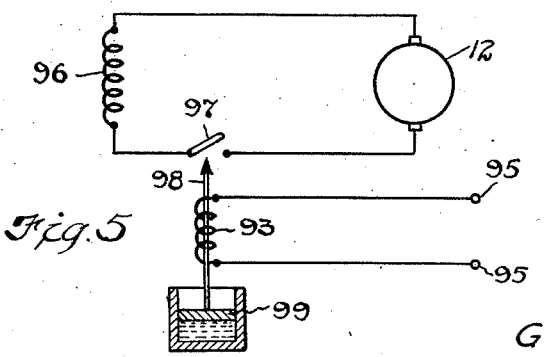

Fig. 1 is a schematic wiring diagram illustrating the principles of this invention; Fig. 2 is an illustration of the mechanical features of one of the relays employed in the general system illustrated in Fig. 1; Fig. 2a is a plan view of the apparatus illustrated in Fig. 2; Fig. 3 is an illustration of a modified form of relay for accomplishing the same purpose for which the relay illustrated in Fig. 2 is designed; Fig. 4 is an illustration of the mechanical details of another of the relays employed in the general arrangement illustrated in Fig. 1; and Fig. 5 is a diagrammatic representation of a simple form of apparatus whereby certain of the results secured by the arrangement illustrated in Fig. 1 may be achieved.

Referring now more specifically to the drawings and more especially to Fig. 1, the apparatus comprising this invention is adapted for use with a welding current generator, generally indicated at 1, to which are connected external leads, generally indicated at 2 and 3 and which respectively are connected to a portable electrode holder 4 and the work 5 which is to be welded. The welding electrode 6 may either be fusible or non-fusible, depending upon the particular welding operation which is to be performed and the character of such electrode in no way affects the operation of the apparatus comprising this invention. The external circuit of the welding current generator 1 has been illustrated as including an interpole field winding 7, an adjustable series field winding 8, a meter shunt 9 and a series relay 10 hereinafter referred to in greater detail.

The welding current generator also preferably includes a shunt field winding 11, energized by a separate exciter 12.

In the exciter circuit which includes the shunt field 11, there is a series rheostat generally indicated at 13, the movable contact arm of which is indicated at 14, of the circular type adjusted by turning a hand-wheel being shown for purposes of convenience.

Before proceeding with a description of the apparatus comprising this invention, it may be well to briefly indicate in more definite terms than heretofore employed, the specific objects which are to be attained by the use of this apparatus. The apparatus comprising this invention and which is now to be described is so designed that should the operator desire to vary the operating characteristics or output of the welding current generator in a particular direction, he will repeatedly strike the arc for a predetermined number of times. The apparatus functionally responsive to such repeated striking of the arc will then move the arm 14 of the rheostat 13 in a particular direction. If the operator desires to vary the output of the generator in a direction opposite to that just explained, he will first strike the arc and hold the same for a predetermined length of time, after which he will repeatedly strike the same as before in order to move the arm 14 of the rheostat 13 in a direction opposite to that first explained.

It should be pointed out at this time that any apparatus of the character presently to be explained to which this invention relates must be so constructed that the operator may repeatedly strike the arc for several times before beginning the welding operation and without varying the setting of the rheostat 13. This latitude is necessary due to the fact that most arc welding operators may, for reasons which need not be explained, strike the arc at least several times before they proceed with the welding operation.

By having reference to Fig. 1, the present invention will first be explained in rather general terms.

The windings 15 and 16 are the windings of a relay, more fully illustrated in Fig. 4, and when separately energized, respectively move the arm 14 of the rheostat in opposite directions. The timing relay 17 diagrammatically represented in Fig. 1 and specifically illustrated in various forms in Figs. 2 and 3 is effective to energize one of the windings 15 and 16 after the arc has been struck repeatedly a predetermined number of times and is likewise effective to energize the other of such windings, if the operator first strikes the arc, then holds the same for a predetermind length of time and thereafter repeatedly strikes the arc for a predetermined number of times before proceeding with the welding operation.

A detailed explanation of the circuit illustrated in Fig. 1 will be given after the mechanical construction of the timing relay 17 and the relay including the windings 15 and 16 has been explained.

Referring now more specifically to Fig. 2, the timing relay 17 here illustrated consists generally of a supporting frame 18 upon which is mounted a vertically extending bracket 19, which, at its upper end, is provided with a horizontally disposed shelf portion 20. Rotatably supported on the bracket 19 by means of a pin 21 is an inertia wheel 22. The bracket 19 is provided with a substantially horizontally extending slot 23 into which extends a pin 24 fastened to the wheel 22. The pin 24 operating in the slot 23, therefore, limits the rotation of the wheel 22 about the axis of its supporting pin or axle 21. Secured to the bracket 19 adjacent the end of the slot 23 is a pin 25 and on the lower portion of the inertia wheel 22 there is another pin 26. The two pins 25 and 26 are connected by means of a coil spring 27 which tends to pull these pins together and therefore results in urging the inertia wheel 22 in a counterclockwise rotation about its axle 21 until the pin 24 carried by the wheel strikes the left end of the slot 23.

Mounted on the right side of bracket 18 is an electro-magnet consisting of a winding 28 and a core 29.

The frame 18 also supports a substantially T-shaped lever which is rotatable about the axis of a supporting pin 30. The lower portion of the head of this T-shaped member indicated at 31 is disposed adjacent the electro-magnet 28. The other portion 32 of the head of this T-shaped member extends upwardly and to it is secured one end of a coil tension spring 33 which, at its other end, is secured by means of a pin 34 to the wheel 22.

The stem 35 of this oscillatable T-shaped member oscillatably supports a pawl 36 by means of a pin 37. The pawl 36 is urged in a counterclockwise direction about the axis of the pin 37 by some suitable means such as a leaf spring 38. The pawl 36 is, however, held in an adjusted predetermined position when the parts are as illustrated in Fig. 2, by means of an adjusting screw 39, carried by the frame 18.

A substantially vertically disposed spindle or shaft 40 is reciprocably supported adjacent its opposite ends by passing through openings respectively formed in the frame 18 and the shelf-like extension 20 of the bracket 19. The spindle 40 carries a serrated enlargement or ratchet portion 41 with which the pawl 36 may engage.

Oscillatably mounted on a pin 42 on the bracket 19 is a detent member 43 which is normally urged in a clockwise direction about the pin 42 by means of a spring 44. The member 43 is provided with a projection 45 which is adapted to engage the serrated portion of the ratchet or enlargement 41 of the spindle 40. The upper end of the member 43 bears against the pin 24 carried by the wheel 22. When such pin is adjacent the left end of the groove 23, if the wheel 22 is rotated clockwise so as to move the pin 24 to the right in the slot 23, then the spring 44 urges the detent member 43 in a clockwise direction until the projection 45 thereon engages the spindle or more specifically, the ratchet portion carried thereby. Supported on the shelf-like portion 20 of the bracket 19 are spaced contact blocks 46 and 47 which are insulated from each other and from the body of the apparatus. The bracket 20 also oscillatably supports a contact member 48 insulated from the contact members 46 and 47 and upon movement adapted to separately engage either of such contact blocks. The pin 24 carried by the wheel 22 has an arm 49 of insulating material associated therewith and to which is secured one end of a coil spring 50, the other end of such coil spring being attached to the movable contact member 48.

The shelf-like bracket 20 also supports a contact block 51 which is adapted to be engaged by movable contact member 52 which is in the form of a spring and which normally assumes the position illustrated in Fig. 2. The head 53 of the spindle 40 is adapted, when such spindle is moved upwardly, to engage the spring 52 and force the same into engagement with the contact block 51.

The operation of the above described remote control relay illustrated in Figs. 2 and 2a will be deferred for the time being until an explanation has been given of the rheostat operating relay illustrated in Fig. 4, so that the operation of the remote control relay illustrated in Fig. 2 may be explained in conjunction with the operation of the entire apparatus.

Referring now more specifically to Fig. 4, the rheostat operating relay here illustrated includes the rheostat operating coils or windings 15 and 16 previously referred to in the brief explanation of Fig. 1. The relay illustrated in Fig. 4 is adapted to move the control arm 14 of the rheostat 13 in opposite directions as the windings 15 and 16 are respectively energized. In order to connect the rheostat operating relay to the control arm 14, the shaft carrying such arm is provided with a sheave or pulley 54 about which there is looped a wire or suitable cord 55. To the opposite ends of the wire 55 there are secured plungers 57 and 58 respectively positioned within the coils or windings 15 and 16. The cores or plungers 57, 58 are supported in suspended relation within the windings 15 and 16 by mean of tension springs 59 and compression springs 60 cooperating with brackets 61. The coil springs 59 pull the brackets 61 downwardly with just sufficient force to counteract the upward pressure on such brackets by the springs 60 which is in excess of the weight of the plungers supported by the brackets. When either of the windings 15 or 16 is energized, the plunger associated therewith will be pulled down, first tensioning the wire 55 about the sheave 54 and as soon as the wire becomes engaged with the sheave, such sheave will be rotated in a direction depending upon which coil has been energized. If one of the coils is energized the same instant that the other is de-energized, the sheave 54 will be rotated approximately twice as far as when the coils are not energized in rapid succession. This is due to the fact that the wire 55 being under tension from the previous stroke begins to move the sheave 54 as soon as the second plunger begins to move.

The operation of the above described apparatus is briefly as follows:—Assuming first, that the rheostat operating relay is connected to the rheostat arm 14 in such a fashion that when the winding 15 is energized, the arm 14 will be moved in a counterclockwise direction and when the winding 16 is energized, the arm 14 will be moved in a clockwise direction. Let us also assume that the operator now desires to change the position of the arm 14 on the rheostat to a new position which requires that such arm be moved in a counterclockwise direction. All that the operator needs to do in order to accomplish this is to rapidly strike the arc for a predetermined number of times. As previously indicated, any apparatus such as that here described must permit the operator to strike the arc for a predetermined number of times without effecting any change in the setting of the rheostat 14. This is necessary so that when the operator strikes the arc for the usual number of times in preparation for welding, he will not disturb the setting of the machine.

We shall assume for purposes of this description that the apparatus herein disclosed has been set so that the operator may strike the arc for five times without effecting any adjustment of the rheostat, but when he strikes it the sixth time, then such adjustment is effected.

Referring now to Figs. 1 and 2, when the operator strikes the arc for the first time, the series relay 10 will close the switch in the leads 62 and 63. The lead 62 is, for convenience, connected to one side of the exciter circuit of the generator and the lead 63 through the various relays is connected to the other side of such circuit. Any suitable source of current supply may, or course, be employed but the exciter circuit is shown as utilized for purposes of convenience.

As soon as the switch 64 is closed, the winding 28 is energized. This causes the arm 31 to be attracted to the core 29 and the arm 35 to be rotated in a clockwise direction about the pin 30; when the arm 35 is rotated, the pawl 36 will move upwardly and to the left into contact with the ratchet 41 and elevate the spindle 40 for one increment of movement. Simultaneously with this occurrence, the arm 32 is moved to the right so that the tension spring 33 connected to the inertia wheel 22 by the pin 34 causes such wheel to rotate in a clockwise direction for an amount depending upon the relationship between the strength of the springs 33 and 27, as well as the inertia of the wheel 22 and the frictional resistance of its supporting axle. These several variables should be so proportioned that for a single impulse or repeated impulses of the electro-magnet 28, the wheel 22 will be maintained in a clockwise position such that the member 48 is maintained in contact with the block 47. Regardless of how often the impulses, due to repeated striking of the arc, are repeated the spring 27 will always maintain the wheel 22 in substantially the position last described; the amount which the wheel varies from such position being dependent upon the rapidity of the impulses.

As soon as the wheel 22 rotates in a clockwise direction to move the pin 24 to the right, as just described, the detent 43 is moved in a clockwise direction about its pivotal support under the influence of the spring 44, until the projection 45 on the detent engages the ratchet 41 on the spindle 40. As such ratchet has been elevated by the pawl 36 for one increment, the detent 43 will maintain the spindle in such elevated position until either the pawl 36 elevates the spindle still further or until the wheel 22 rotates in a counterclockwise direction so that the pin 24 forces the detent 43 out of engagement with the ratchet.

Assuming now that the arc is repeatedly struck for five times, this will cause the ratchet 41 to be elevated through four increments which is just sufficient to cause the head 53 of the spindle 40 to force the spring 52 into engagement with the contact 51. When the contacts 51 and 52 are closed, the circuit is then completed through contacts 46 and 48 through the relay winding 15, which advances the rheostat arm 14 in a counterclockwise direction for one increment of movement depending in magnitude upon the throw of the plunger 57, as illustrated in Fig. 4. Any further repeated making and breaking of the arc will, for each such tap, advance the arm 14 in a counterclockwise direction for one increment, so that the operator may adjust the rheostat in this direction for any desired amount. The operator then proceeds to weld in the usual fashion and as soon as the arc is again broken, de-energizing the winding 28, the wheel 22 is permitted to rotate in a counterclockwise direction under the influence of the spring 27 until the pin 24 carried by the wheel reaches the left end of the slot 23, the pin moving to the left end of the slot engaging the detent 43, causing disengagement between the projection 45 and the ratchet 41 permitting the spindle 40 to drop back into the position illustrated in Fig. 2 under the influence of its own weight.

Should the operator now desire to rotate the rheostat control arm 14 in a clockwise direction, i. e., opposite from the direction just explained, the procedure would be as follows:—He would first short circuit the arc for an appreciable predetermined length of time. Short circuiting the arc has the effect of continuously energizing the electromagnet 28. When the magnet 28 is continuously energized, the spring 33 exerts a continuous pull on the wheel 22 urging the same in a clockwise direction. If the magnet 28 is energized for a period long enough for the spring 33 to overcome the inertia of the wheel 22, such wheel will then rotate for a distance sufficient to carry the pin 24 past a vertical line through the axle 21, i. e., until the pin 24 moves to the right-hand end of the slot 23. When the pin 24 moves to this extreme position, the spring 50 connected to the contact member 48 will have crossed the point of pivotal support of such contact member so that the contact member 48 will be moved in a clockwise direction into engagement with the contact member 47. The operator then rapidly makes and breaks the arc for a predetermined number of times and each time he taps the electrode to the work, striking the arc, the spindle 40 will be moved upwardly until the contacts 51 and 52 are closed. The repeated striking of the arc maintains the inertia wheel rotated in a clockwise direction to a position such that member 48 is maintained in contact with the block 47. After the arc has been repeatedly struck, for a number of times sufficient to close contact members 51 and 52, then the coils 16 of the rheostat relay will be energized and for each tap of the arc, the rheostat arm 14 will be moved for one increment in a clockwise direction so that the operator may continue tapping the arc until the desired point of adjustment has been reached.

From the foregoing it will be apparent that all the operator has to do in order to move the rheostat arm 14 in either direction for any amount is to either begin tapping the electrode until the desired adjustment has been attained in one direction, or if he wishes to adjust the rheostat in the other direction, he first shorts the arc for a predetermined length of time and then taps the arc repeatedly until the desired point of adjustment is attained in such opposite direction.

The apparatus illustrated in Fig. 3 is another form of remote control relay for producing substantially the same results as produced by the construction illustrated in Figs. 2 and 2a. In the apparatus illustrated in Fig. 3 the winding 28a is similar to the winding 28 found in the construction illustrated in Fig. 2 and indicated at 28 in Fig. 1. The winding 28a is suitably supported in a housing generally indicated at 65. Vertically oscillatably supported in the housing 65 is a reciprocable spindle 66. The weight 67 is supported on the upper end of the spindle 66 and at its lower end, the spindle carries a piston member 68 which operates in a dash-pot generally indicated at 69. Rigidly supported in the housing 65 are a plurality of depending studs 70 which, at their lower ends, are provided with stops in the form of lock nuts 71 and 72. One of the studs 70, i. e., the one provided with the stops 71, is provided with a second stop 73. Spanning the studs 70 is a link 74 which is provided with enlarged openings through which pass the studs 70 and the spindle 66.

Surrounding the spindle 66 and movable relatively thereto and relatively to the winding 28 is an armature sleeve 75. This sleeve 75 is, at its lower end, provided with studs 76 and 77, which also project through enlarged openings in the member 74. To the stud 76 there is secured a stop member 78 for the purpose hereinafter more fully explained.

Positioned within the armature sleeve 75 is a second sleeve 79. The sleeve 79 is normally supported by means of legs 80 on the plate 74. The legs 80 pass through openings provided therefor in a plate 81 carried by the studs 76 and 77 adjacent the lower end of the armature sleeve 75.

The sleeve 79 and the armature sleeve 75 are urged axially apart by means of a coil spring 82 arranged about the spindle 66.

The sleeve 79 is provided with a plurality of circumferentially spaced radially extending openings in which are respectively positioned balls 83. The sleeve 75 carries an equivalent number of set-screws 84 provided with cam faces on their inner ends so angularly related to the axis of the sleeve 75 that when the sleeve 75 is moved upwardly upon energization of the coil 28a, such cam faces force the balls 83 into engagement with the spindle 66, so that the spindle is carried upwardly with the armature sleeve 75.

Supported in the housing 65 are spaced contacts 85, 86 and 87. Connected in the circuit are rheostat operating coils or windings 15a and 16a similar to 15 and 16 of Fig. 1. Oscillatably supported in the housing 65 are movable contact members 88 and 89 respectively connected with a collar 90 on the spindle 66 by means of coil springs 91 and 92.

The position of the apparatus illustrated in Fig. 3 in the circuit illustrated in Fig. 1 is similar to the position occupied in such circuit by the apparatus illustrated in Figs. 2 and 2a. The winding 28a is in series with the series relay 10 so that each time the arc is struck, the winding 28a is energized.

Assuming now that the operator desires, by the use of the apparatus illustrated in Fig. 3, to move the rheostat arm 14 in a counterclockwise direction, this is accomplished by energizing the winding 15a. In order to accomplish this when using the apparatus illustrated in Fig. 3, when the operator first strikes the arc, the coil 28a is energized drawing the armature 75 upwardly against the stop provided therefor. As the armature 75 moves upwardly the cam faces on the screws 84 engage the balls 83, force the same into engagement with the spindle 66 and move the spindle upwardly. The armature 75 and the inner sleeve 79 therefore, travel upwardly together and the studs 76 and 77 carry the plate 74 upwardly until the left end of such plate strikes the stop 73, whereupon continued upward movement of the armature 75 will cause the portion of the plate 74 lying on the right-hand side of the spindle 66 to move upwardly into engagement with the projections 80 on the inner sleeve forcing such inner sleeve upwardly ahead of the armature, thereby disengaging the balls 83 and freeing the spindle 66. If the operator does not now immediately re-strike the arc to again energize the coil 28a, the weight 67 will force the spindle 66 downwardly, overcoming the resistance of the dash-pot 69. The dash-pot 69, however, holds the spindle in the upward position for a length of time sufficient to permit the operator to restrike the arc causing the armature 75 to again move upwardly carrying the spindle 66 along therewith for another increment of movement. After the operator has struck the arc five times or any other suitable number of times to which the apparatus may be adjusted so as not to interfere with the normal welding operation, the spring 92 will cross the point of pivotal support of the contact member 89, which is then caused to move upwardly into engagement with the contact block 87, completing the circuit through the winding 15a. After the contact member 89 has moved into engagement with the block 87, the operator will continue his tapping of the electrode at a rate related to the rate at which the dash-pot 69 permits the spindle 66 to settle between successive taps. By continued tapping at the proper rate, the contact member 89 may be held in engagement with the contact block 87 and the contact member 88 held in engagement with the contact block 86, so that such further repeated taps repeatedly energize the winding 15a to advance the rheostat arm 14 in a counterclockwise direction one increment of movement for each tap. Should the operator have difficulty in tapping the electrode at the proper rate so as to maintain the member 89 in contact with the block 87 without causing the contact member 88 to snap into engagement with the block 85, he may simply wait after having struck the electrode the sixth time until the spindle 66 has had an opportunity to settle into the dash-pot and then by repeating the first five taps, he may further adjust the rheostat in the desired direction by another sixth tap.

When the apparatus illustrated in Fig. 3 is employed, and the operator desires to move the rheostat arm 14 in a clockwise direction, i. e., by energization of winding 16a, he will first strike the arc rapidly for a number of times sufficient to elevate the spindle 66 until the spring 91 crosses the point of support of the contact member 88, whereupon such member will move into engagement with the contact block 85. The member 89 will have previously, as above explained, moved into engagement with the contact member 87, so that the circuit is now completed through the coil 16a. The operator may then, by any repeated number of taps of the electrode, move the rheostat arm 14 for a corresponding number of increments of movement until the desired point of adjustment is attained.

From the foregoing description, it will be noted that the operator may, before beginning the welding operation, change the operating characteristics of the generator 1 in any desired manner by merely tapping the electrode to the work in a predetermined manner. By the employment of this invention, the operating characteristics of the welding current generator are, at all times, under the direct control of the operator at the welding station and such control may be effected regardless of the distance the operator may be away from the machine.

For certain types of use, and for certain classes of work, it may not be necessary for the operator to be able to both increase and decrease the output of the machine. It may be sufficient that the operator may, by simply striking the arc, either increase or decrease the output of the machine and if this simple control is desired, it is not necessary to employ the apparatus just explained and particularly illustrated in Figs. 2 and 3, but the much more simple apparatus illustrated in Fig. 5 may be employed instead.

Referring now to this last-named figure, a solenoid coil 93 is connected across the terminals of the welding current generator. Also connected across the terminals of the exciter is a rheostat operating coil 96, which, when energized, is adapted to move the rheostat arm 14 for one increment of movement in a predetermined direction. In the circuit in series with the winding 96 is a switch 97 adapted to be actuated by the movable armature 98 of the electro-magnet 93, such armature being connected with a suitable dash-pot 99.

When the welding circuit is open, sufficient current will be forced through the winding 93 to raise the plunger 98 for a distance sufficient to open the switch 97. As soon as the arc is shorted, the amount of current in the winding 93 will be reduced permitting the plunger 98 to drop and the switch 97 to close, this resulting in an energization of the winding 96 and a consequent movement of the rheostat arm 14 in a predetermined direction. The operator may, therefore, by holding the arc a predetermined number of times, adjust the rheostat to any desired extent.

This last described apparatus, of course, is not as flexible as the previously described forms of construction although, as above indicated, it may be found satisfactory for certain simple controls.

The herein described invention has been explained in connection with an arc welding circuit and more particularly for the purpose of regulating or controlling the output of a welding current generator. It is to be understood, however, that the principles of this invention are equally applicable to the control of any common form of dynamo electric machine and by employing the principles of this invention, an operator may, at a remote point from the machine sought to be controlled, effect such control by merely interrupting, for a predetermined number of times, the external circuit of the machine.

It should also be noted that the apparatus comprising this invention has been applied to effect a control over the variable resistance unit included in the separately excited circuit of the machine. It will be understood that the windings 15 and 16 and the associated apparatus illustrated in Fig. 4 may be employed for the purpose of effecting an adjustment of the series field 8. In the co-pending application of George G. Landis, Serial No. 698,857, filed Nov. 20, 1933, there is disclosed a number of different schemes whereby the strength of the series field in the generator may be adjusted and controlled. In the several illustrated schemes in said co-pending application, there are included adjustable means similar to the movable rheostat arm 14 of the disclosure in this application, and it is within the contemplation of this invention to apply the apparatus disclosed herein to the disclosures of the aforesaid co-pending application for the purpose of effecting a movement of the control means for the series field. It is also within the contemplation of this invention that, should it be desired the relays 15 and 16 or a second pair of such relays connected therewith may be employed to simultaneously actuate separate control means respectively in the series and shunt or separately excited field winding circuits of the generator.

The apparatus comprising the present invention has been described as applied to an electric current generator, and the changes in the operating characteristics of the generator have been secured by a variation in the excitation of the machine. It is to be noted however that the apparatus herein described may be employed to, in various other ways, change the operating characteristics of the machine. For instance, the herein described apparatus may be advantageously employed to secure the desired results by directly acting upon the driving means for the generator, and by a suitable change such as in the speed of the driving means, produce the desired results. When the driving means for the generator is an electric motor, the rheostat 13 may be in the power line to such motor. It is also within the contemplation of our invention to employ the actuating means for the rheostat as a means whereby the driving means for the generator may be de-energized or stopped. This latter result may be accomplished by connecting the rheostat actuating relay to a switch in the power line of an electric motor or to the throttle lever of an internal combustion engine, when such engine is employed to drive the generator. When the apparatus is connected to the throttle lever of an internal combustion engine, the speed of such engine may be varied in the same manner as the speed of an electric motor by means of a rheostat.

The herein described apparatus for changing the operating characteristics of the generator is characterized by being functionally responsive to the making and breaking of an electric circuit. For convenience the arcing circuit has been employed in the apparatus herein illustrated and described in order that no additional leads need be carried to the portable electrode holder from the generator. It is evident of course that a separate circuit may be employed, and when this is done, a switch or switches may be mounted on the electrode holder to make and break such circuit.

If this last mentioned expedient is employed, instead of a making and breaking of the arc circuit, two sets of leads may be carried to the portable electrode holder and with two switches then provided on such holder. The energization of the windings 15 and 16 may be effected directly by means of such switches, without the employment of any such relay as is illustrated in Figs. 2 and 3.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. The combination with an electric arc welding current generator and an external arcing circuit, of means for controlling the operating characteristics of said generator, said means being functionally responsive to variations in the characteristics of said external circuit and effective to accomplish such control only after the occurrence of a predetermined number of particularly related variations in said characteristics different from such variations as occur during the normal welding operation.

2. The combination with an electric arc welding current generator and an external arcing circuit, of means for controlling the operating characteristics of said generator, said means being functionally responsive to variations in the amount of current flow in said external circuit and effective to accomplish such control only after the occurrence of a predetermined number of such current variations different from those occurring during the normal welding operation.

3. The combination with an electric arc welding current generator and an external arcing circuit, of means for controlling the operating characteristics of said generator, and a relay adapted to operate said controlling means, said relay being functionally responsive to variations in the characteristics of said external circuit and effective to move said control means only after the occurrence of a predetermined number of particularly related variations in such characteristics different from those occurring during the normal welding operation.

4. The combination with an electric arc welding current generator and an external arcing circuit, of means for controlling the operating characteristics of said generator, and a relay adapted to operate said controlling means, said relay being functionally responsive to variations in the amount of current flow in said external circuit and effective to move said control means only after the occurrence of a predetermined number of particularly related current variations in said external circuit different from the current variations occurring during the normal welding operation.

5. The combination with an electric arc welding current generator and an external arcing circuit, of means for varying in opposite directions the operating characteristics of said generator, said means being effective to accomplish said variation only upon the occurrence of a predetermined number of variations in the characteristics of said external circuit and the direction of such control being determined by a particular relation between such variations.

6. The combination with an electric arc welding current generator and an external arcing circuit, of means for varying in opposite directions the operating characteristics of said generator, said means functionally responsive to variations in the characteristics of said external circuit and effective to accomplish such control in a particular direction for a given number of such variations and to effect such control in the opposite direction as such variations continue to occur in excess of such given number.

7. The combination with an electric arc welding current generator and an external arcing circuit, of an adjustable rheostat so connected that adjustment thereof varies the operating characteristics of said generator, and a relay functionally responsive to particularly related variations in the amount of current flow in said external circuit and effective to adjust said rheostat cumulatively by small amounts upon repeated occurrences of such variations in current flow.

8. The combination with an electric arc welding current generator and an external arcing circuit, of an adjustable rheostat so connected that adjustment thereof varies the operating characteristics of said generator, and a relay functionally responsive to variations in the amount of current flow in said external circuit and effective to adjust said rheostat cumulatively by small amounts in one direction upon repeated occurrences for a given number of times of such variations in current flow, and to move said rheostat in the opposite direction as said current variations occur in excess of said given number of times.

9. The combination with an electric arc welding current generator and an external arcing circuit, of means for controlling the operating characteristics of said generator, and a relay adapted to operate said controlling means, said relay being functionally responsive to a short-circuiting of said external circuit and effective to move said control means only after the external circuit has been short-circuited a predetermined number of times within a relatively short period of time.

10. The combination with an electric arc welding current generator and an external arcing circuit, of means for controlling the operating characteristics of said generator, and a relay adapted to operate said controlling means, said relay being functionally responsive to a closing of at least one branch of said external circuit and effective to move said control means only after said branch of the external circuit has been closed a predetermined number of times within a relatively short period of time.

11. The combination with an electric arc welding current generator and an external arcing circuit, of means for controlling the operating characteristics of said generator, and a relay functionally responsive to a closing of said external circuit for moving said control means, said relay being effective to move said control means only after said external circuit has been closed and reopened in rapid succession a predetermined number of times.

12. The combination with an electric arc welding current generator and an external arcing circuit, of means for controlling the operating characteristics of said generator, and a relay functionally responsive to a closing of said external circuit for moving said control means, said relay being effective to move said control means only after said external circuit has been closed and reopened within a limited length of time and in a particular manner different from the manner in which the circuit is closed and reopened by a striking and restriking of an arc during the normal welding operation.

13. The combination with an electric arc welding current generator and an external arcing circuit, of means for controlling the operating characteristics of said generator, and a relay functionally responsive to variations in the amount of current flow in said external circuit for moving said control means, said relay being effective to move said control means only upon the occurrence in rapid succession of a predetermined number of such current variations and the character of such movement being determined by a particular controlled relation between such current variations.

14. The combination with an electric arc welding current generator and an external arcing circuit, of an adjustable rheostat for varying the operating characteristics of said generator, and a relay functionally responsive to particularly related variations in the amount of current flow in said external circuit for effecting an adjustment of said rheostat, said relay being effective to adjust said rheostat only after the occurrence in rapid succession of a predetermined number of such current variations.

15. The combination with an electric arc welding current generator and an external arcing circuit, of an adjustable rheostat for varying the operating characteristics of said generator, and a relay functionally responsive to variations in the amount of current flow in said external circuit for effecting an adjustment of said rheostat, said relay being effective to adjust said rheostat only after the occurrence in rapid succession of a predetermined number of such current variations and the character of such movement being determined by the manner in which such current variations occur.

16. The combination with an electric arc welding current generator and an external arcing circuit, of an adjustable rheostat so connected with the generator that movement of the rheostat in opposite directions respectively increases and decreases the output of the generator, and a relay functionally responsive to variations in the amount of current flow in said external circuit for moving said rheostat, said relay being effective to move said rheostat only after the occurrence in rapid succession of a predetermined number of such current variations different from those occurring during the normal welding operation.

17. The combination with an electric arc welding current generator and an external arcing circuit, of an adjustable rheostat so connected with the generator that movement of the rheostat in opposite directions respectively increases and decreases the output of the generator, and a relay functionally responsive to variations in the amount of current flow in said external circuit for moving said rheostat in opposite directions, said relay effective to move said rheostat only after the occurrence in rapid succession of a predetermined number of such current variations and the direction of such movement being determined by the manner in which said current variations occur.

18. The combination with an electric arc welding current generator and an external arcing circuit, of an adjustable rheostat connected with one of the field windings of said generator and by an adjustment of which the output of the generator may be varied, and a relay functionally responsive to variations in the amount of current flow in said external circuit for adjusting said rheostat, said relay being effective to move said rheostat only after the occurrence in rapid succession of a predetermined number of such current variations different from those occurring during the normal welding operation.

19. The combination with an electric arc welding current generator having a series field winding and an additional field winding, and an external arcing circuit, of an adjustable rheostat in series with said additional field winding, and a relay being functionally responsive to variations in the amount of current flow in said external circuit for adjusting said rheostat, said relay being effective to move said rheostat only after the occurrence in rapid succession of a predetermined number of such current variations different from those occurring during the normal welding operation.

20. The combination with an electric arc welding current generator having a series field winding and an additional field winding, and an external arcing circuit, of an adjustable rheostat in series with said additional field winding, and a relay functionally responsive to variations in the amount of current flow in said external circuit for adjusting said rheostat in opposite directions, said relay being effective to move said rheostat only after the occurrence in rapid succession of a predetermined number of such current variations and the direction of such movement being determined by the manner in which such current variations occur.

21. The combination with an electric arc welding current generator and an external arcing circuit, of means for controlling the operating characteristics of said generator, said means being functionally responsive to variations in the characteristics of said external circuit and effective to accomplish such control only after the occurrence of a particular variation in said characteristics different from such variations as occur during the normal welding operation

GEORGE G. LANDIS.
NORMAN J. HOENIE.